(12) United States Patent
Borer

(10) Patent No.: US 6,377,621 B2
(45) Date of Patent: *Apr. 23, 2002

(54) MOTION COMPENSATED INTERPOLATION

(75) Inventor: Timothy John Borer, Smallfield (GB)

(73) Assignee: Leitch Europe Limited, Surrey (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,219
(22) PCT Filed: Sep. 19, 1996
(86) PCT No.: PCT/GB96/02305
§ 371 Date: Mar. 17, 1998
§ 102(e) Date: Mar. 17, 1998
(87) PCT Pub. No.: WO97/11557
PCT Pub. Date: Mar. 27, 1997

(30) Foreign Application Priority Data

Sep. 21, 1995 (GB) .............................. 9519311

(51) Int. Cl.$^7$ ................................ H04B 1/66
(52) U.S. Cl. ................. 375/240; 375/240; 375/240.17; 375/240.18
(58) Field of Search ................ 348/431, 452, 348/699, 700, 416, 443, 413, 407; 375/240, 240.17, 240.18

(56) References Cited

U.S. PATENT DOCUMENTS

| | | | | |
|---|---|---|---|---|
| 5,208,667 A | * | 5/1993 | Saunders | 348/452 |
| 5,257,102 A | * | 10/1993 | Wilkinson | 348/699 |
| 5,363,146 A | * | 11/1994 | Saunders et al. | 348/699 |
| 5,394,196 A | * | 2/1995 | Robert | 348/699 |
| 6,069,918 A | * | 5/2000 | Meyer et al. | 375/240 |

FOREIGN PATENT DOCUMENTS

WO      WO 94/01970      1/1994

OTHER PUBLICATIONS

By P. Robert et al., "Advanced High–Definition 50 to 60–Hz Standards Conversion", *SMPTE Journal*, vol. 98, No. 6, Jun. 1989, pp. 420–424.

J.K. Aggarwal et al., "On the computation of motion from sequences of images—a review", pp. 917–935, Proceedings of the IEEE, vol. 76, No. 8, Aug. 1988.

Matthias Bierling et al., "Motion compensating field interpolation using a hierarchically structured displacement estimator", pp. 387–404, Signal Processing, vol. II, No. 4, Dec. 1986.

Tim Borer, "Television standards conversion", pp. 76–191 and 6 drawings.

(List continued on next page.)

*Primary Examiner*—Andy Rao
*Assistant Examiner*—Shawn S. An
(74) *Attorney, Agent, or Firm*—Young & Thompson

(57) ABSTRACT

This invention provides a way of performing improved motion compensated interpolation of moving images, such as television, using motion vectors of variable reliability. By taking into account the reliability of the motion vectors, produced by a separate motion estimation device, a subjectively pleasing interpolation can be produced. This is in contrast to simple motion compensated interpolation, taking no account of motion vector reliability, which is often degraded by objectionable switching artifacts due to unreliable motion vectors. The invention can be used, for example, to improve the performance of motion compensated standards converters used for converting between television standards with different picture rates. The invention allows a gradual transition between motion compensated and non-motion compensated interpolation depending on the reliability of the motion vector used. This is achieved by modifying the temporal interpolation timing, using a look up table, controlled by a vector reliability signal produced by the motion estimator. Effectively this adapts the motion trajectory of the interpolated output pictures.

15 Claims, 4 Drawing Sheets

OTHER PUBLICATIONS

T.J. Borer et al., "Motion compensated display field rate upconversion", pp. 321–325, International Broadcasting Convention, Sep. 21–25, 1990.

L. Chiariglione et al., "Pre– and post–processing in a video terminal using motion vectors", pp. 332–335, Centro Studie Laboratori Telecommunicazioni, Italy.

Eric Dubois et al., "Review of techniques for motion estimation and motion compensation", pp 3B.3.1–3B.3.19, INRS–Telecommunications, Quebec.

Gary Ellis, "Motion adaption–the everyday solution to Varispeed Disk playback", 5 pages, Institution of Electrical Engineers, May 3, 1995.

B. Girod, "Motion–compensating field interpolation from interlaced and non–interlaced grids", pp. 1–8, 2nd International Technical Symposium on Optical and Electro–Optical Applied Science and Engineering: Image Processing Symposium, Cannes, Dec. 1985.

Elena Marcozzi et al., "Motion compensated interpolation", pp. 61–68, Advances in Image Processing, SPIE vol. 804, 1987.

D.M. Martinez, "Model–based motion estimation and its application to restoration and interpolation of motion pictures", Technical Report No. 530, pp. 1–160, Massachusetts Institute of Technology, Jun. 23, 1987.

A.N. Netravali et al., "Motion–compensated television coding: Part 1", pp. 631–670, The Bell System Technical Journal, Mar. 1979, vol. 58, No. 3.

P. Robert et al., "Advanced high–definition 50 to 60–Hz standards conversion", pp. 420–424, SMPTE Journal, Jun. 1989.

R. Thoma et al., "Motion compensating interpolation considering covered and uncovered background", pp. 191–212, Elsevier, vol. 1, No. 2, Oct. 1989.

G.A. Thomas et al., "Generation of high quality slow–motion replay using motion compensation", pp. 121–125, International Broadcasting Convention, Sep. 21–25, 1990.

G.A. Thomas, "Television motion measurement for DATV and other applications", pp. 1–20, British Broadcasting Corporation, Nov. 1987.

G.A. Thomas, "Distorting the time axis: motion–compensated image processing in the studio", pp. 256–258 plus 1 drawing, International Broadcasting Convention, Sep. 23–27, 1988.

Rod Thomson, "Problems of estimation and measurement of motion in television", pp. 1–9, Snell & Wilcox.

G.J. Tonge, "Time–sampled motion portrayal", Second International Conference Image Processing and its Applications, pp. 215–219, Imperial College of Science and Technology, Jun. 24–26, 1986.

J.F. Vega–Riveros et al., "Review of motion analysis techniques", pp. 397–402, IEE Proceedings, vol. 136, Pt. 1, No. 6, Dec. 1989.

J.O. Drewery, "TV the grand illusion", 8 pages, The Institution of Electrical Engineers, May 3, 1995.

\* cited by examiner a = spatial output coordinates
b = original temporal output coordinate $t_n$
c = modified temporal output coordinate $t_{out}$

MOTION COMPENSATED INTERPOLATION

BACKGROUND OF THE INVENTION

Field of the Invention

The invention relates to a method and apparatus for processing film or video signals which avoids objectionable switching artifacts when performing motion compensated temporal interpolation. This is useful, for example, in the inter-conversion of television pictures with different picture rates. The invention is also suitable for methods and systems which use motion adaption instead of motion compensation.

DESCRIPTION OF THE RELATED ART

In this application, the term picture is used as a generic term covering picture, field or frame depending on the context. Film and television provide a sequence of still pictures that create the visual illusion of moving images. Providing the pictures are acquired and displayed in an appropriate manner the illusion can be very convincing. J. Drewery, in reference 9, eloquently describes the nature of the illusion. In modern television systems it is often necessary to process picture sequences from film or television cameras. Processing which changes the picture rate reveals the illusory nature of television. A typical example is the conversion between European and American television standards which have picture rates of 50 and 60 Hz respectively. Conversion between these standards requires the interpolation of new pictures intermediate in time between the input pictures. Many texts on signal processing describe the interpolation of intermediate samples, for a properly sampled signal, using linear filtering. Unfortunately, linear filtering techniques applied to television standards conversion may fail to work. Fast moving images can result in judder, blurring or multiple images when television standards are converted using linear filtering. This illustrates the illusory nature of television systems. The difficulty of processing television signals is because they are under-sampled in a conventional Nyquist sense. Further details can be found in reference 23.

Many people have expounded the benefits of motion compensation as a way of overcoming the problems of processing moving images (references 2, 3, 4, 5, 11, 13, 15, 16, 17, 18, 19, 21). Motion compensation attempts to process moving images in the same way as the human visual system. The human visual system is able to move the eyes to track moving objects, thereby keeping their image stationary on the retina. Motion compensation tries to work in the same way. Corresponding points on moving objects are treated as stationary which avoids the problems due to under sampling (reference 3, 25). In order to do this it is assumed that the image consists of linearly moving rigid objects (sometimes slightly less restrictive assumptions can be made). In order to apply motion compensated processing it is necessary to track the motion of the moving objects in an image. Many techniques are available to estimate the motion present in image sequences (references 1, 2, 3, 4, 8, 12, 14, 20, 24).

With suitable input pictures motion compensation has been demonstrated to give a very worthwhile improvement in the quality of processed pictures. Under favourable conditions the artifacts of standards conversion using linear filtering, that is judder, blurring and multiple imaging, can be completely eliminated. Motion compensation, however, can only work when the underlying assumptions are valid. In unfavourable circumstances the assumption that, for example, the image consists of linearly moving rigid objects is violated. When this happens the motion estimation system, necessary for motion compensation, is unable to reliably track motion and random motion vectors can be produced. When the motion estimation system fails the processed pictures can contain subjectively objectionable switching artifacts. Such artifacts can be significantly worse than the linear standards conversion artifacts which motion compensation is intended to avoid.

Ideally a motion compensated processing system would provide the full benefits of motion compensation on suitable pictures while performing as well as, or better, then conventional linear processing on unfavourable pictures. In order to achieve this the system must change between interpolation methods depending on the suitability of the pictures for motion compensated processing. The system would, therefore, adapt between motion compensated and non-motion compensated processing As with adaptive television systems in general it is inadvisable for there to be a sudden switch between interpolation methods. Such a switch can, of itself, produce switching artifacts when the pictures are of approximately equal suitability for motion compensated or non-motion compensated processing. A system which gradually changes from motion compensated to non-motion compensated processing according to the suitability of the pictures is said to exhibit graceful fall-back. The non-motion compensated processing method is known as the fall-back mode.

In order to implement a motion compensated system with graceful fall-back it is necessary to know when the pictures are unsuitable for motion compensation. This depends on whether the motion estimator can produce reliable vectors. Hence it is necessary for the motion estimator to indicate whether the vectors it is producing are reliable. R Thomson, in reference 22, provides an excellent discussion of the above arguments and describes how, in a phase correlation type motion estimation system, an indication of the reliability of motion vectors is given by the relative height of the correlation peaks produced. Other motion estimation systems can also be designed to provide an indication of vector reliability. A block matching motion estimator, for example, could provide the match error for the selected vector as a measure of vector quality.

Another requirement for motion compensation with graceful fall-back is a suitable, non-motion compensated, fall-back mode. One obvious possibility is to fade between a motion compensated algorithm and a conventional linear filtering algorithm. This approach, however, has a number of disadvantages. Unless the pictures are particularly suitable for motion compensation the output pictures would include a small proportion of a conventional interpolation with its attendant artifacts. The presence of these artifacts, albeit at a low level, might be sufficient to undermine the reason (artefact free pictures) for performing motion compensation in the first place. Nor is linear filtering particularly suitable as a fall-back algorithm. Linear filtering only works properly when the picture is stationary or slowly moving. This is unlikely to be the case when the motion estimator is unable to reliably track motion.

SUMMARY OF THE INVENTION

It is an object of the present invention to allow graceful fallback of interpolation systems. This is achieved by gradually changing the temporal interpolation phase between a full temporal interpolation and selection of the temporally nearest input picture, that is, picture repeat where the phase of the temporal interpolation is coincident with the nearest input picture. The degree to which the temporal interpolation phase is modified depends on the reliability of the motion vector used in the interpolation.

The invention provides a method of interpolating in processing of video or film signals comprising storing input pixel values of an input signal in an input store, assigning a motion vector to each set of output coordinates to be interpolated, providing an indication of the reliability of each motion vector, modifying the temporal coordinate of each set of output coordinates depending on the reliability of the corresponding motion vector, and selecting at least one pixel value from the input store depending on the motion vector and the modified temporal output coordinate, an interpolated output pixel value is determined from said at least one pixel value. Thus, if the vector reliability is assured, the interpolation phase is coincident with that of the output picture phase. As the vector reliability decreases the phase of the interpolation is shifted towards the temporally nearest input picture. At zero, or a minimum specified, vector reliability the interpolation is equivalent to picture repeat.

The input store may store a plurality of pictures, at least one pixel value being selected from each picture, and a corresponding filter coefficient is selected from a coefficient store for each pixel value, the value of the output pixel is determined from a weighted sum of the plurality of pixel values multiplied by their corresponding coefficients. The filter coefficients being stored in a second memory.

The temporal coordinates may be modified by using a lookup table, the transfer characteristic of which is determined by the reliability of the motion vector.

In one aspect of the invention, the motion vector assigned to each set of output coordinates is zero, and a motion detector is used to give an indication of how reliable a zero motion vector is for each set of output coordinates.

The invention also provides a video or film signal processing interpolation apparatus comprising an input store for storing pixel values of an input signal, means providing an indication of the reliability of a motion vector assigned to each set of output coordinates to be interpolated, means modifying the temporal coordinate of each set of output coordinates depending on the reliability of the corresponding motion vector, and a vector processor which selects at least one pixel value from the input store depending on the modified temporal output coordinate and the corresponding motion vector.

The apparatus may comprise a plurality of multipliers and associated coefficient stores, and an adder, the input store being adapted to store a plurality of pictures. The vector processor selects at least one pixel value from each picture and a corresponding coefficient for each pixel value, the output pixel value being calculated from a sum of the selected pixel values weighted by the corresponding coefficient.

The apparatus may further comprise a motion detector, the motion vector assigned to each set of output coordinates is zero and the motion detector supplies an indication of the reliability of a zero motion vector to the means for modifying the temporal coordinate of each set of output coordinates. Alternatively, the apparatus may comprise a motion estimation device which assigns motion vectors to each output coordinate and is adapted to provide an indication of the reliability of each motion vector to the means for modifying the temporal coordinate of each set of output coordinates. The motion estimator may be of the block matching type, the indication of reliability is given by the match error.

BRIEF DESCRIPTION OF THE DRAWINGS

The invention will now be described in more detail and by way of example only with reference to the accompanying drawings, in which.

DESCRIPTION OF THE PREFERRED EMBODIMENTS

The basic assumption underlying motion compensation is that the image comprises a collection of linearly moving rigid objects. In motion compensated processing image processing operations are performed in the frame of reference of the moving object rather than the frame of reference of the image. This avoids processing problems associated with temporal aliasing due to under sampling the pictures in time. Motion compensation and the reasons for it are described in detail in many references for example 3, 11, and 25. Provided the assumption of linear motion is obeyed then the spatio-temporal trajectory of the objects can be represented by straight lines in space/time as illustrated in FIG. 1.

Despite the demonstrable success of motion compensated processing some images (or parts of images) do not conform to the underlying assumptions. Violation of these assumptions will occur for partially transparent or translucent objects (e.g. smoke), changes in shape or lighting and cuts between different scenes etc. Such violations occur often in typical moving pictures and therefore must be processed acceptably. Small deviations from the assumptions are acceptably processed using motion compensation. As the deviations become larger motion compensated processing becomes less and less acceptable as it becomes increasingly difficult to find a representative motion vector. For large violations of the motion compensation assumptions the motion estimator will fail completely producing essentially random motion vectors. Nevertheless it is still necessary to produce processed images even when the motion estimator has failed completely. In these circumstances perhaps the only reasonable interpolatian method is to make the output picture the same as the (temporally) nearest input picture. This is known as picture (or field) repeat in television terms and zeroth order interpolation in signal processing parlance. A motion trajectory for picture repeat is shown in FIG. 2.

Figure 1:
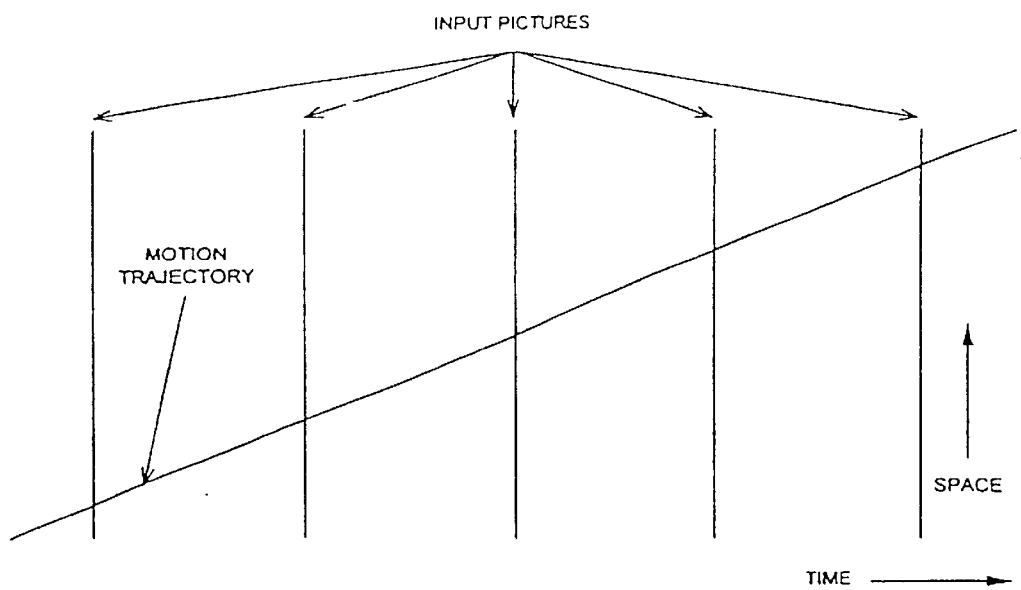
FIG. 1 shows the motion trajectory of a linearly moving object.
Figure 2:
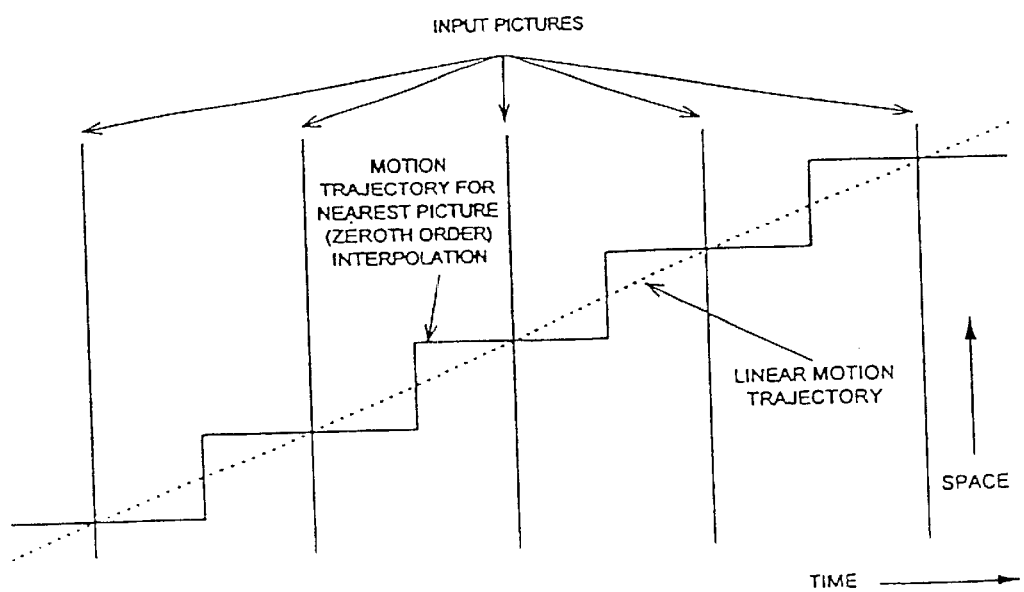
FIG. 2 shows the motion trajectory for picture repeat interpolation.
Figure 3:
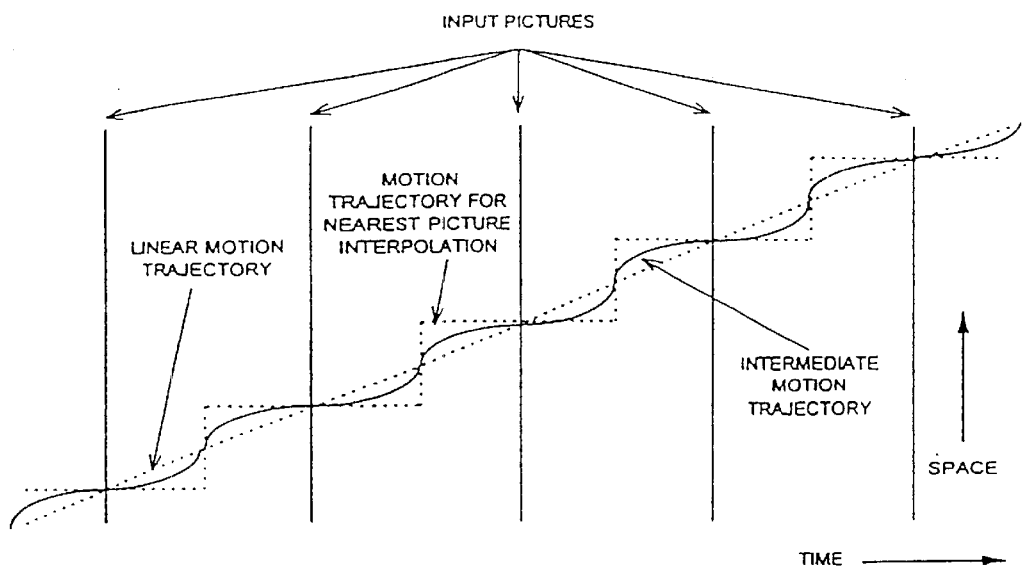
FIG. 3 shows a motion trajectory intermediate between those shown in FIGS. 1 and 2.

With motion vectors of intermediate reliability an interpolation method is required between the two extremes of full motion compensation and picture repeat illustrated in FIGS. 1 and 2. One way to do this is to assume a motion trajectory between those for the two extremes. This is the basis of this invention. FIG. 3 illustrates such an intermediate motion trajectory.

Figure 4:
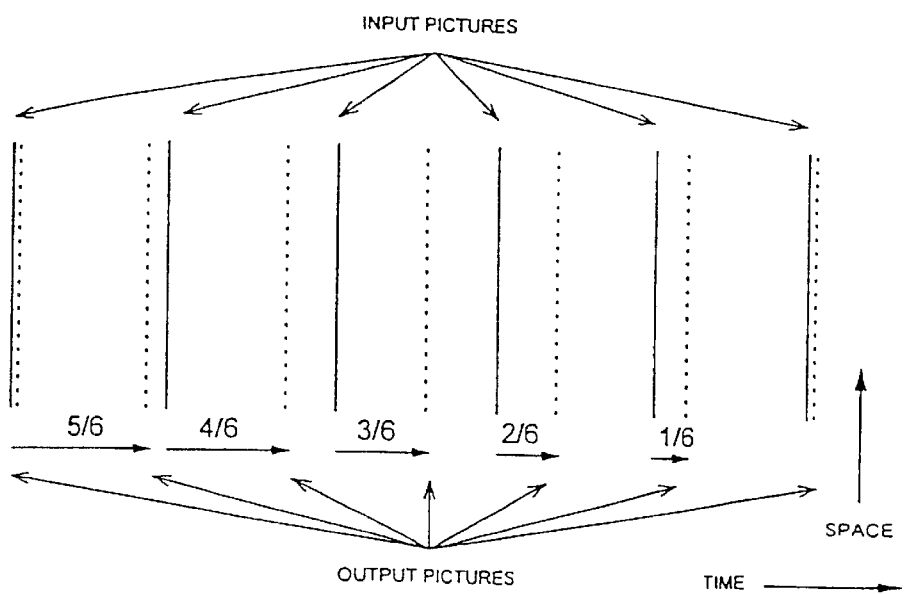
FIG. 4 shows the relative timing of input and output pictures for conversion between signals of 50 and 60 Hz.

To achieve an intermediate motion trajectory the time to which an interpolated output picture corresponds is modified depending on the temporal interpolation phase and the motion vector reliability. The temporal interpolation phase is the time in the input sequence at which an output picture is required. The temporal interpolation phase is most conveniently expressed in terms of input picture periods. For example, consider converting between television signals with 50 and 60 pictures/second. The first output picture (at 60 Hz) may be required coincident with an input picture (at 50 Hz) the second output picture 5/6 of the way between the first 2 input picture, the third output picture 4/6 of the way between the 2nd and 3rd input picture and so on. This would give a sequence of temporal interpolation phases of 0, 5/6, 4/6, 3/6, 2/6, 1/6, 0 and produce 6 output pictures for every 5 input pictures. This is illustrated in FIG. 4. Note that the phase of each temporal interpolation always lies in the range 0 to 1. Strictly, the temporal interpolation phase is the fractional part of the output time for which an output picture is generated, expressed in input picture periods. The relative timing of input and output pictures is discussed in many texts dealing with digital sample rate changing, for example reference 7.

For full motion compensation output pictures are generated for time instants corresponding to the temporal interpolation phase (see reference 3). This corresponds to the linear motion trajectory of FIG. 1. For picture repeat output pictures are generated corresponding to the time of the temporally nearest input picture, giving the motion trajectory of FIG. 2. Intermediate motion trajectories can be achieved by generating output pictures corresponding to instants intermediate between the temporal interpolation phase and the time of the nearest input picture. The extent to which the timing of output pictures is moved from the temporal interpolation phase towards the nearest input picture time would depend on the reliability of the motion vectors from the motion estimator. By changing the interpolated motion trajectory in a continuous way a graceful fall back from full motion compensation to picture repeat can be achieved. This is the basis of the invention which can thereby achieve an acceptable interpolation method for all parts of the moving image even if the motion vectors are unreliable. Switching artifacts, due to changing between interpolation modes, are avoided by a continuum of motion trajectories between the two extremes.

Figure 5:
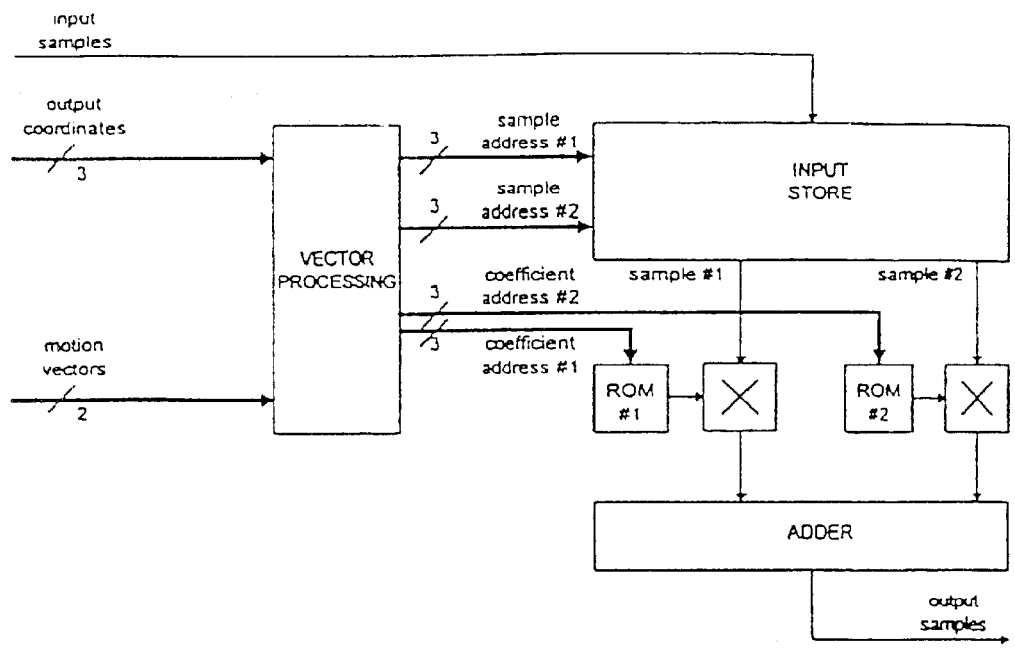
FIG. 5 is a schematic of a standard motion compensated interpolation system.

A generic motion compensated interpolator is illustrated in FIG. 5. The interpolator has three inputs, a stream of input samples corresponding to the sequence of scanned input pictures, a stream of output co-ordinates and a stream of motion vectors. The output co-ordinates are the (spatio-temporal) co-ordinates for which values of the output image sequence are calculated. They are generated by counters etc. as described in the literature, for example references 3 & 6. The input stream of motion vectors provides the motion vector associated with each output co-ordinate. In each operating cycle a new output co-ordinate is presented to the interpolator which (after a delay) generates the value of the corresponding output pixel. The vector processor combines the output co-ordinates and corresponding motion vector to produce a set of input sample addresses and coefficient addresses for each output co-ordinate (as described in reference 3). The output pixel value is generated by calculating a weighted sum of input pixel values. The sample addresses correspond to the integer part of the required input co-ordinate and are used to select the appropriate input pixel values, stored in the input store, and these are weighted by coefficients selected from a precalculated set of filter coefficients stored in ROM. The filter coefficients are addressed by the fractional part of the input co-ordinate calculated by the vector processor. The output value is the sum of all the partial results presented by the set of multipliers. For brevity the diagram only shows two multipliers. In practice the number would probably be significantly more; 16 being a typical number for a motion compensated interpolator. Typically, the output pixel co-ordinate is measured in input fields and input picture lines. The motion speed is measured in input picture lines per field period. The size of the filter aperture is specified in terms of fields and lines, an aperture of 4 lines, therefore, corresponds to 8 picture lines. Because the input pixel values are addressed by the integer part of the input co-ordinate, the filter aperture is motion compensated to the nearest integer number of field lines per field period. The remaining, sub-pixel, motion compensation is achieved by varying the filter coefficients. Further details of both non-motion compensated and motion compensated interpolators can be found in the literature (e.g. references 3, 4, 6, 19, 21).

Figure 6:
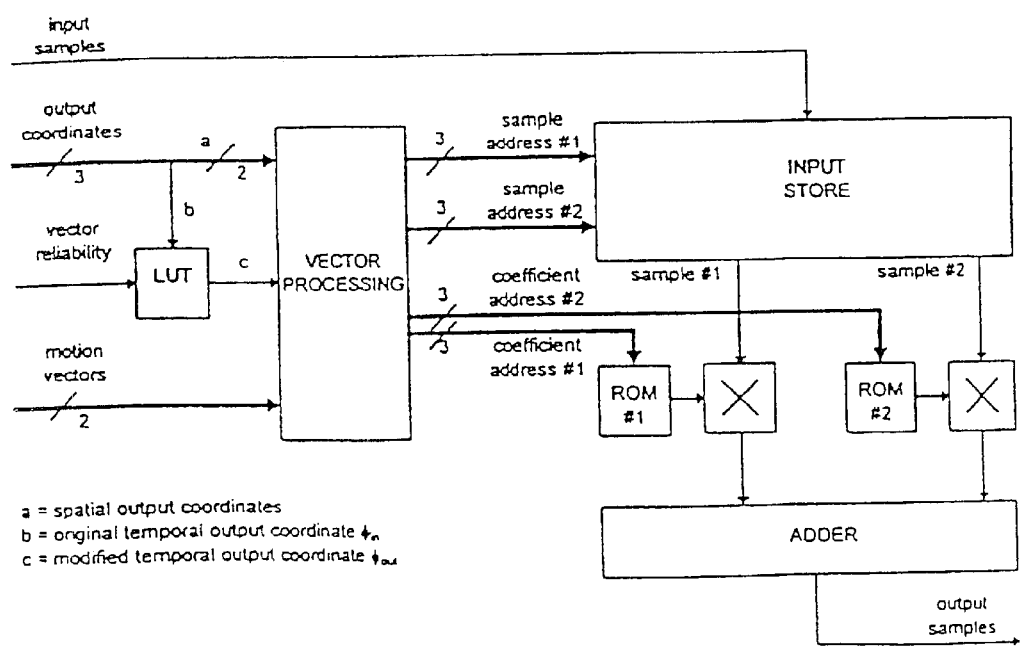
FIG. 6 is a schematic showing an interpolation device according to the present invention.

The motion compensated interpolator of FIG. 5 can be modified to provide adaptive motion trajectories controlled by the reliability of the motion vectors. This is illustrated in FIG. 6. Motion compensated interpolation is, in general, a 3 dimensional interpolation process. Consequently it should be borne in mind that the output co-ordinates, presented to the interpolator, comprise a 3 component vector. The components are the horizontal, vertical and temporal parts of the output co-ordinates. To produce adaptive motion trajectories the temporal interpolation phase is passed through a lookup table whose transfer characteristic is controlled by the reliability of the motion vector. The lookup table could conveniently be implemented using a Read Only Memory (ROM). The temporal interpolation phase is the fractional part of the temporal output co-ordinate; usually this is all that is presented to the interpolator. In general for each output co-ordinate there can be a distinct corresponding motion vector and indication of vector reliability associated with that motion vector. Hence the motion trajectory can adapt on a pixel by pixel basis to obtain the best interpolation for each part of the image. Different parts of the image can, therefore, have different motion trajectories even if they have the same motion vector because of the different levels of reliability of the motion vectors. Thus, better processing of regions having low vector reliability can be achieved, for example, areas of revealed and obscured background. These regions would be interpolated using temporally nearest picture interpolation while other parts of the image might be fully motion compensated.

Figure 7:
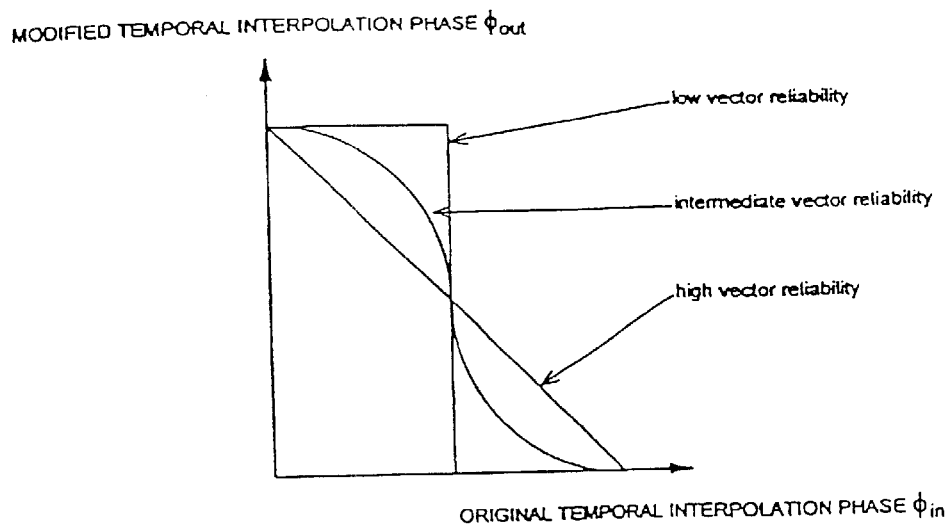
FIG. 7 shows possible transfer characteristics suitable for adaptive motion compensated interpolation.

The transfer characteristic of the look up table (LUT) in FIG. 6 is controlled by the vector reliability signal from the motion estimator and determines the interpolated motion trajectory. Typical transfer characteristics for the lookup table are illustrated in FIG. 7. The original temporal interpolation phase ($\phi_{in}$) presented to the lookup table is in the range 0 to 1. Assuming the reliability signal is also scaled to lie in the range 0 to 1 then a suitable transfer characteristic for the lookup table would be given by equation 1.

$$\phi_{out} = \frac{1}{2}\left(1 - \tanh\left(\frac{\text{arctanh}(2\phi_{in} - 1)}{r}\right)\right) \qquad \text{Equation 1}$$

where $\phi_{in}$ is the original temporal interpolation phase, r is the reliability of the motion vector and $\phi_{out}$ is the modified temporal interpolation phase. Other sets of transfer functions for the look up table are also possible.

The technique described above can be applied to motion compensated temporal interpolators described in the literature. The improvement is achieved by making allowance for the reliability of motion vectors produced, by an external motion estimation device, for the interpolator. The invention assumes the availability of a motion estimator which provides an indication of the reliability of the vectors it produces. By taking account of the reliability of the motion vectors objectionable switching artifacts can be avoided, thereby improving picture quality. The invention allows the interpolation method used to change smoothly from full motion compensation to non-motion compensation. This provides graceful fall-back when violation of the assumptions underpinning motion estimation prevents the motion estimator measuring a reliable motion vector.

Graceful fall-back of motion compensated interpolation is achieved by modifying the motion trajectory of moving objects in the interpolated pictures. When the reliability of motion vectors is high a linear motion trajectory is used corresponding to full motion compensation. When motion vector reliability is low a stepwise motion trajectory is used corresponding to non-motion compensated interpolation. For intermediate vector reliability the motion trajectory used is intermediate between these two extremes. Modulation of the motion trajectory is achieved by passing the temporal interpolation phase, supplied to the interpolator, through a lookup table whose transfer characteristic is controlled by the vector reliability.

This invention can also be used in conjunction with a motion detector rather than a motion estimator. In reference 10 of the annex, a motion adaptive system is described in which interpolated images are produced using temporal interpolation by applying a temporal filter aperture between successive fields. To avoid unacceptable artifacts such as double imaging when there is gross motion between successive fields, a motion detector is utilised to alter the temporal aperture on a pixel by pixel basis.

A motion adaptive system may be regarded as a motion compensation system in which a single motion vector (zero) is used. The present invention can be implemented in a motion adaptive system, therefore, with the motion detector giving an indication of the reliability of the zero motion vector. The invention is applicable in this case when the output picture rate is different to the input rate, for example, in standards conversion or slow motion replay.

Figure 8:
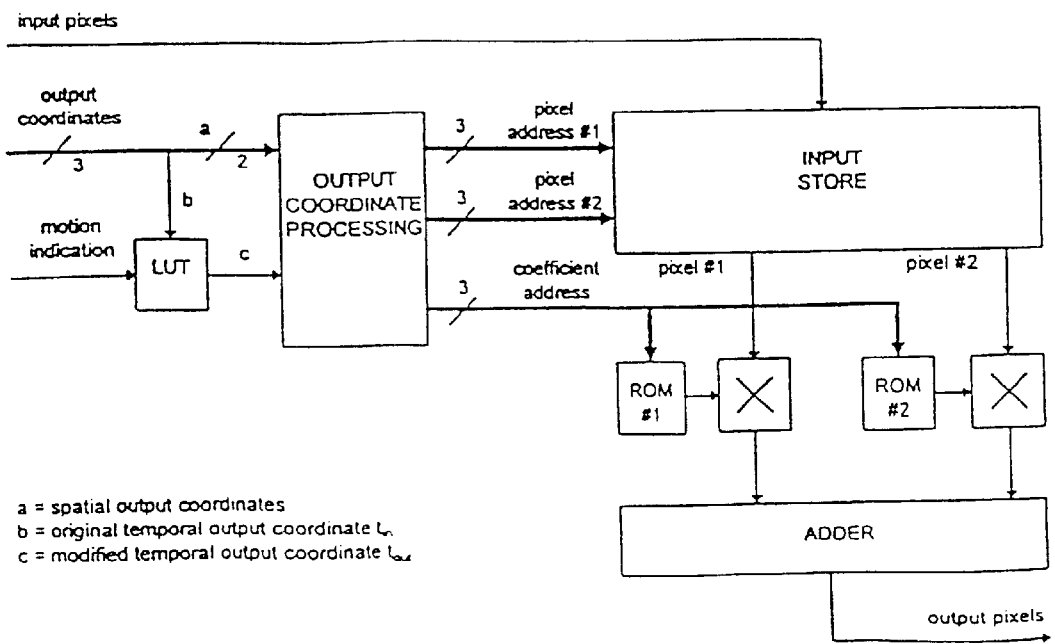
FIG. 8 is a schematic showing an interpolation device according to second embodiment of the invention.

FIG. 8 implements the invention in a motion adaptive system. The output co-ordinate processor in FIG. 8 is substantially the same as the vector processor of FIGS. 5 and 6 except that there is no input for motion vectors as these are all notionally zero. The motion indication from the motion detector replaces the vector reliability indication in FIG. 6.

In this embodiment, as the motion across the aperture increases the reliability of the zero motion vector decrease and the phase of the temporal interpolation is shifted towards the temporally nearest input picture. This system is an improvement over previous motion adaptive systems as there is a reduction in multiple imaging and an improvement in the spatial resolution. Furthermore, the size of the coefficient stores can be reduced. If the temporal aperture is additionally varied with the change in motion, then, larger coefficient stores are required. The use of motion adaptive systems provides a cheap and convenient way of implementing the invention.

Whilst embodiments of the invention have been described, these are by way of example only and modifications will suggest themselves to those skilled in the art without departing from the scope of the invention as defined by the appended claims. For example, the means of modifying the temporal coordinate of the output coordinates may be other than by using a look up table, for example, using suitable logic circuitry. This approach provides an efficient implementation of a piecewise linear transfer characteristic and could be embodied in field programmable gate array or custom gate array integrated circuit. Modification of the temporal coordinate may also be achieved using a state machine which might, additionally, use stored values of vector reliability (corresponding to spatially and temporally neighbouring pixels). In this latter case, the modification of the temporal phase would depend on the vector reliability of neighbouring pixels as well as the current pixel.

REFERENCES

1. Aggarwal, J. K. & Nandhakumar, N. 1988 On the computation of motion from sequences of images—a review. Proc. IEEE, vol. 76, pp. 917–935, August 1988.

2. Bierling, M., Thoma, R. 1986. Motion compensating field interpolation using a hierarchically structured displacement estimator. Signal Processing, Volume 11, No. 4, December 1986, pp. 387–404. Elsevier Science publishers.

3. Borer, T. J., 1992. Television Standards Conversion. Ph.D. Thesis, Dept. Electronic & Electrical Engineering, University of Surrey, Guildford, Surrey, GU2 5XH, UK. October 1992.

4. Borer, T. J., Hulyer, M. G. & Parker, D. W. 1990. Motion compensated display field rate upconversion. International Broadcasting Convention, Brighton, England, September 1990. IEE Publication No. 327. ISBN 0 85296000.

5. Chiariglione, L., Corgnier, L. & Guglielmo, M. 1986. Pre- and post-processing in a video terminal using motion vectors. IBC. Brighton 1986.

6. Clarke C. K. P. 1990. Interpolation. Digital Television edited by Sandbank, C. P., John Wiley & Sons Ltd, 1990 ISBN 0-471-92360-5, pp 287–374.

7. Crochiere, R. E. & Rabiner, L. R. 1983 Multirate digital signal processing. Prentice Hall, ISBN 0-13-605162-6.

8. Dubois, E., Konrad, J., 1990. Review of techniques for motion estimation and motion compensation. Forth international colloquium on advanced television systems, Ottawa, Canada, June 1990.

9. Drewery, J. O., 1995. TV—The grand illusion. I.E.E. Colloquium on motion reproduction in television. I.E.E. Digest No: 1995/093, 3rd May 1995.

10. Ellis, G. 1995. Motion adaption—the everyday solution to a varispeed disk playback. I.E.E. Colloquium on motion reproduction in television. I.E.E Digest No: 1995/093, May 3, 1995.

11. Girod, B. & Thoma, R 1985. Motion-compensating field interpolation from interlaced and non-interlaced grids. 2nd international technical symposium on optical and electro-optical science and engineering: Image processing symposium, Cannes, December 1985.

12. Huahge, T. S., Tsai, R. Y., 1981. Image sequence analysis: Motion estimation. Image sequence analysis, T. S. Huange (editor), Springer-Verlag, Berlin, Germany, 1981, pp. 1–18.

13. Marcozzi, E. & Tubaro, S. 1987. Motion compensated interpolation. SPIE, Vol. 804, Advances in image processing, pp 61–68.

14. Martinez, D. M. 1987. Model-based motion estimation and its application to restoration and interpolation of motion pictures. RLE Technical Report No. 530. June 1987. Research Laboratory of Electronics, Massachusetts Institute of Technology, Cambridge, Mass. 02139 USA.

15. Netravali, A. N., Robbins, J. D. 1979. Motion compensated television coding, Part 1. Bell Syst. Tech. J., vol. 58, pp 631–670, March 1979.

16. Reuter, T. 1989. Standards conversion using motion compensation. Signal processing 16, 1989, pp 73–82.

17. Robert, P. Lamnabhi, M., Lhuillier, J. J. 1989. Advanced high definition 50 to 60 Hz standards conversion. SMPTE Journal, June 1989 pp 420–424.

18. Thoma, R. & Bierling, M. 1989. Motion compensated interpolation considering covered and uncovered background.

19. Thomas, G. A., & Lau, H. Y. K. 1990. Generation of high quality slow-motion replay using motion compensation. International Broadcasting Convention, Brighton, England. IEE Publication No. 327 ISBN 0 85296000.

20. Thomas, G. A., 1987 Television motion estimation for DATV and other applications. BBC Research Department report No. 1987/11. September 1987.

21. Thomas, G. A., 1988. Distorting the time axis: Motion compensated image processing in the studio. International Broadcasting Convention, Brighton. England. September 1988. Published by IEE ISBN 0 85296368 8.

22. Thomson, R. 1995. Problems of Estimation and Measurement of Motion in Television. I.E.E. Colloquium on motion reproduction in television. I.E.E Digest No: 1995/093, May 3, 1995.

23. Tonge, G. J. 1986. Time sampled motion portrayal. Proceedings of the second international conference on image processing and its applications, Imperial College of Science and Technology, London Jun. 24–26, 1986, organised by the I.E.E., pp 216–219.

24. Vega-riveros, J. F. Jabbour, K. 1986. Review of motion analysis techniques. IEE Proceedings, Vol. 136, Pt I., No. 6, December 1989.

25. Watkinson J. 1994. The Art of Digital Video 2nd Edition pp 238–264. Focal Press. ISBN 0 240 51369.13.

What is claimed is:

1. A method of interpolating in processing of video or film signals comprising:
   storing input pixel values of an input signal in an input store,
   assigning a motion vector to each set of output coordinates to be interpolated,
   providing an indication of a degree of reliability of each said assigned motion vector, wherein the degree of reliability has a predetermined upper and lower limit, and wherein the degree of reliability may be assigned at least one intermediate value between the upper and lower limits,
   modifying a temporal coordinate of each said set of output coordinates depending on the degree of reliability of the corresponding assigned motion vector, and
   selecting at least one pixel value from the input store depending on the assigned motion vector and the modified temporal output coordinate, an interpolated output pixel value being determined from said at least one pixel value;
   wherein each said temporal coordinate is modified using a lookup table, a transfer characteristic of which is determined by the degree of reliability of the corresponding motion vector; and
   wherein the transfer characteristic used to modify each said temporal coordinate is given by the following equation:

$$\phi_{out} = \frac{1}{2}\left(1 - \tanh\left(\frac{\text{arctanh}(2\phi_{in} - 1)}{r}\right)\right).$$

2. A method of interpolating in processing of video or film signals as claimed in claim 1, wherein the input store stores a plurality of pictures, at least one pixel value is selected from each picture and a corresponding coefficient is selected from a coefficient store for each pixel value, the value of the output pixel is determined from a weighted sum of the plurality of pixel values multiplied by their corresponding coefficients.

3. A method of interpolating in processing of video or film signals for motion compensated interpolation as claimed in claim 1, wherein the motion vector assigned to each set of output coordinates is assumed to be zero and a motion detector is used to give an indication of how reliable a zero motion vector is for each set of output coordinates.

4. A video or film signal processing interpolation apparatus comprising:
   an input store for storing pixel values of an input signal,
   means adapted to assign a motion vector to each set of output coordinates to be interpolated,
   means providing an indication of a degree of reliability of each said assigned motion vector, wherein the degree of reliability has a predetermined upper and lower limit, and wherein the degree of reliability may be assigned at least one intermediate value between the upper and lower limits,
   means adapted to modifying a temporal coordinate of each said set of output coordinates depending on the degree of reliability of the corresponding assigned motion vector, and
   a vector processor which selects at least one pixel value from the input store depending on the modified temporal output coordinate and the corresponding motion vector;
   wherein said means adapted to modify the temporal coordinate of each said set of output coordinates includes a lookup table; and
   wherein the lookup table has a transfer characteristic given by the following equation:

$$\phi_{out} = \frac{1}{2}\left(1 - \tanh\left(\frac{\text{arctanh}(2\phi_{in} - 1)}{r}\right)\right)$$

where $\Phi_{in}$ is the original temporal interpolation phase;
r is the reliability of the motion vector; and
$\Phi_{out}$ is the modified temporal interpolation phase.

5. A video or film signal processing interpolation apparatus as claimed in claim 4 and further comprising a plurality of multipliers and associated coefficient stores, and an adder, the input store being adapted to store a plurality of pictures, the vector processor selects at least one pixel value from each of said plurality of pictures and a corresponding coefficient for each said pixel value, the output pixel value being calculated from a sum of the selected pixel values weighted by the corresponding coefficient.

6. A video or film signal processing interpolation apparatus as claimed in claim 4, and further comprising a motion detector, wherein the motion vector assigned to each said set of output coordinate is assumed to be zero and the motion detector supplies the indication of the degree of reliability of a zero motion vector to the means for modifying the temporal coordinate of each said set of output coordinates.

7. A video or film signal processing interpolation apparatus as claimed in claim 4, further comprising a motion estimation device which assigns motion vectors to each said set of output coordinates and is adapted to provide the indication of the degree of reliability of each motion vector to the means for modifying the temporal coordinate of each set of output coordinates.

8. A video or film processing interpolation apparatus as claimed in claim 7, wherein the motion estimator is a block matching type and the indication of the degree of reliability is given by the match error.

9. A method of interpolating in process in of video or film signals comprising:
   storing input pixel values of an input signal in an input store,
   assigning a motion vector to each set of output coordinated to be interpolated,
   providing an indication of reliability of each said assigned motion vector,
   modifying a temporal coordinate of each said set of output coordinates depending on the reliability of the corresponding assigned motion vector by using a lookup table having a transfer characteristic determined by the reliability of the corresponding motion vector, and
   selecting at least one pixel value from the input store depending on the assigned motion vector and the modified temporal output coordinate, an interpolated output pixel value being determined from said at least one pixel value,
   wherein the transfer characteristic is based on the following equation:

$$\phi_{out} = \frac{1}{2}\left(1 - \tanh\left(\frac{\operatorname{arctanh}(2\phi_{in} - 1)}{r}\right)\right)$$

where $\Phi_{in}$ is the original temporal interpolation phase;
r is the reliability of the motion vector; and
$\Phi_{out}$ modified temporal interpolation phase.

10. A video or film signal processing interpolation apparatus comprising:
   an input store for storing pixel values of an input signal,
   means adapted to assign a motion vector to each set of output coordinates to be interpolated,
   means providing an indication of reliability of said motion vector,
   means adapted to modifying a temporal coordinate of each said set of output coordinates depending on the reliability of the corresponding assigned motion vector, and
   a vector processor which selects at least one pixel value from the input store depending on the modified temporal output coordinate and the corresponding motion vector
   wherein said means adapted to modifying a temporal coordinate includes a lookup table having a transfer characteristic given by the following equation:

$$\phi_{out} = \frac{1}{2}\left(1 - \tanh\left(\frac{\operatorname{arctanh}(2\phi_{in} - 1)}{r}\right)\right)$$

where $\Phi_{in}$ is the original temporal interpolation phase;
r is the reliability of the motion vector; and
$\Phi_{out}$ is the modified temporal interpolation phase.

11. A method of interpolating in processing of video or film signals comprising:
   storing input pixel values of an input signal in an input store,
   assigning a motion vector to each set of output coordinates to be interpolated,
   providing an indication of a degree of reliability of each said assigned motion vector,
   modifying a temporal coordinate of each said set of output coordinates according to a transfer characteristic which is dependant on the degree of reliability of the corresponding assigned motion vector, and
   selecting at least one pixel value from the input store depending on the assigned motion vector and the modified temporal output coordinate, an interpolated output pixel value being determined from said at least one pixel value, wherein the modifying step is performed based on only a fractional part of the temporal coordinate.

12. The method of claim 11, wherein if the degree of reliability is above an upper predetermined value, the modifying step is performed to provide a linear motion trajectory.

13. The method of claim 12, wherein if the degree of reliability is below a lower predetermined value, the modifying step is performed to provide a stepwise motion trajectory.

14. The method of claim 13, wherein if the degree of reliability is between the upper and lower predetermined values, the modifying step is performed to provide an intermediate motion trajectory between said linear motion trajectory and said stepwise motion trajectory.

15. A method of interpolating in processing of video or film signals comprising:
   storing input pixel values of an input signal in an input store,
   assigning a motion vector to each set of output coordinates to be interpolated,
   providing an indication of a degree of reliability of each said assigned motion vector,
   modifying a temporal coordinate of each said set of output coordinates according to a transfer characteristic which is dependant on the degree of reliability of the corresponding assigned motion vector, and
   selecting at least one pixel value from the input store depending on the assigned motion vector and the modified temporal output coordinate, and interpolated output pixel value being determined from said at least one pixel value, wherein the degree of reliability has a predetermined upper and lower limit, and wherein the degree of reliability may be assigned at least one intermediate value between the upper and lower limits.

* * * * *